(12) United States Patent
Yontz

(10) Patent No.: US 8,240,333 B2
(45) Date of Patent: Aug. 14, 2012

(54) SEPARATOR FOR A RELEASE VALVE

(75) Inventor: Phillip T. Yontz, Rock Hill, SC (US)

(73) Assignee: Conbraco Industries, Inc., Pageland, SC (US)

( * ) Notice: Subject to any disclaimer, the term of this patent is extended or adjusted under 35 U.S.C. 154(b) by 509 days.

(21) Appl. No.: 12/498,442

(22) Filed: Jul. 7, 2009

(65) Prior Publication Data

US 2011/0005610 A1    Jan. 13, 2011

(51) Int. Cl.
*F16K 24/01*    (2006.01)
(52) U.S. Cl. .................................. 137/588; 137/218
(58) Field of Classification Search .............. 137/218, 137/588
See application file for complete search history.

(56) References Cited

U.S. PATENT DOCUMENTS

| | | | | |
|---|---|---|---|---|
| 633,913 A | * | 9/1899 | Silverthorn | 137/588 |
| 714,585 A | * | 11/1902 | Ketelsen | 141/305 |
| 4,276,897 A | * | 7/1981 | Griswold | 137/218 |
| 4,364,408 A | * | 12/1982 | Griswold et al. | 137/107 |
| 4,523,607 A | * | 6/1985 | Daghe et al. | 137/218 |
| 4,553,563 A | * | 11/1985 | Daghe et al. | 137/494 |
| 4,611,627 A | * | 9/1986 | Eidsvoog et al. | 137/588 |
| 4,893,651 A | * | 1/1990 | Herman et al. | 137/588 |
| 5,669,405 A | * | 9/1997 | Engelmann | 137/115.07 |
| 6,021,805 A | * | 2/2000 | Horne et al. | 137/375 |
| 6,470,910 B2 | * | 10/2002 | Blackbourn et al. | 137/588 |

OTHER PUBLICATIONS

Watts, Series 909 Reduced Pressure Zone Assemblies, 2009, pp. 1-4, ES-909S 0815, Andover, MA.

* cited by examiner

*Primary Examiner* — John Rivell
*Assistant Examiner* — Seth Faulb
(74) *Attorney, Agent, or Firm* — Shumaker, Loop & Kendrick, LLP

(57) ABSTRACT

An improvement for a backflow release valve of the type used for a backflow event in a supply line is provided. The improvement includes an air-liquid separator in fluid communication with the release valve and the supply line for reducing the amount of air entrained within a liquid solution entering the release valve, thereby reducing the total volume of liquid solution entering the release valve and minimizing the entrainment of water into air breaking a vacuum condition in the supply line.

12 Claims, 18 Drawing Sheets

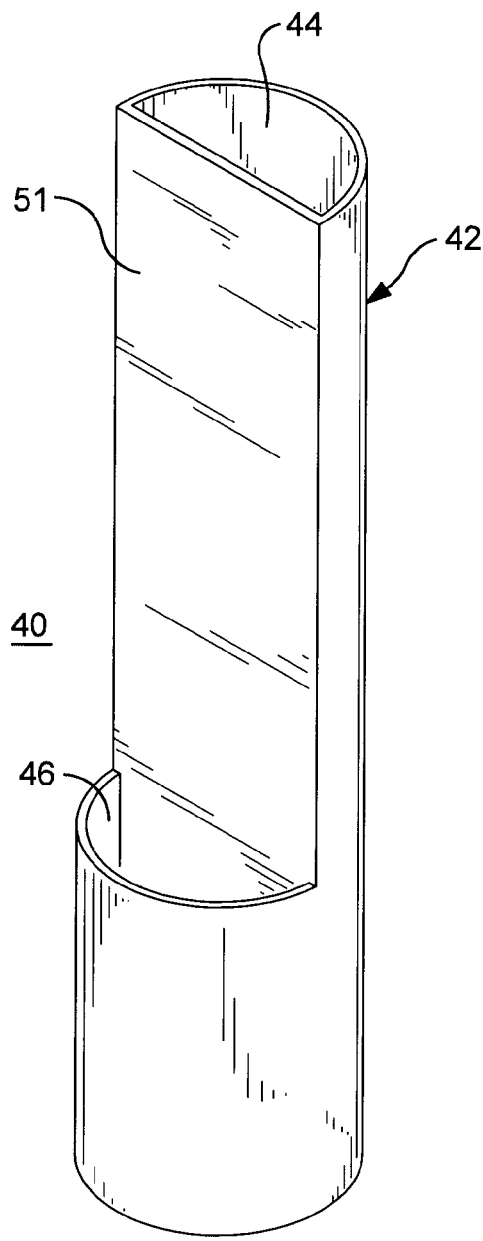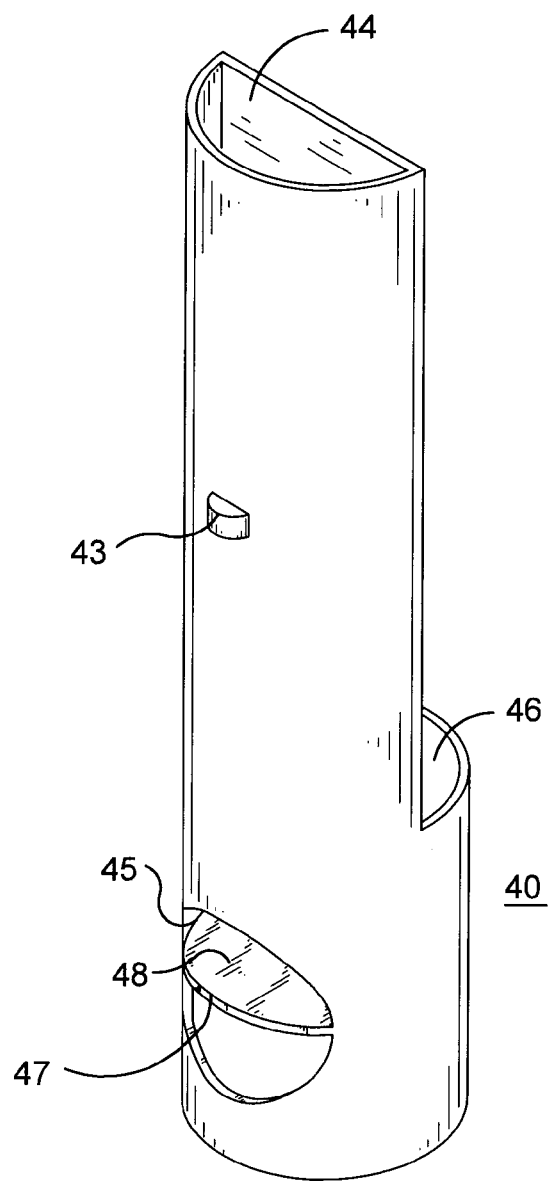
FIG. 4a
FIG. 4b

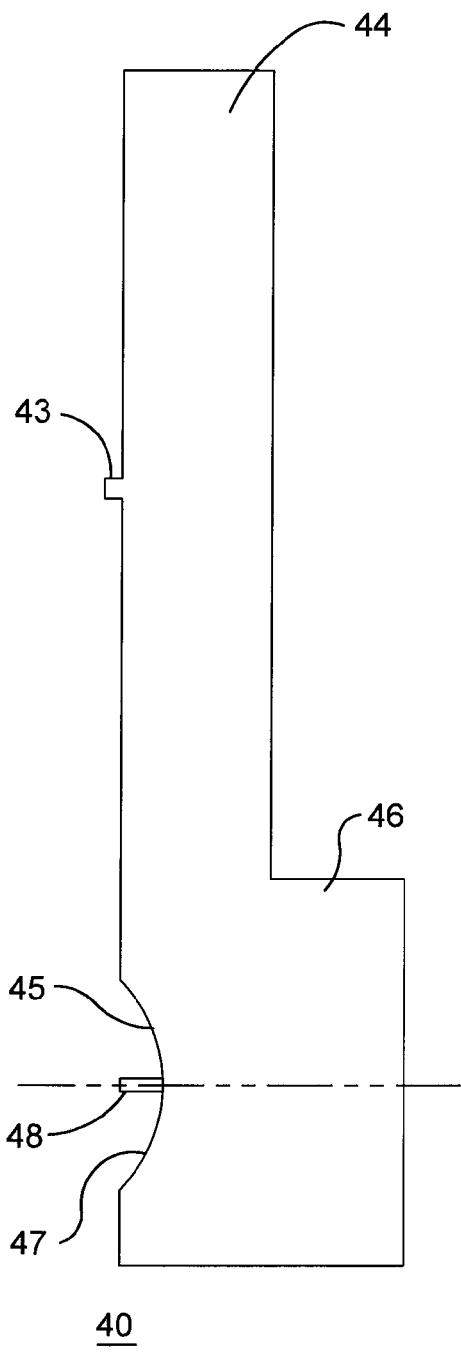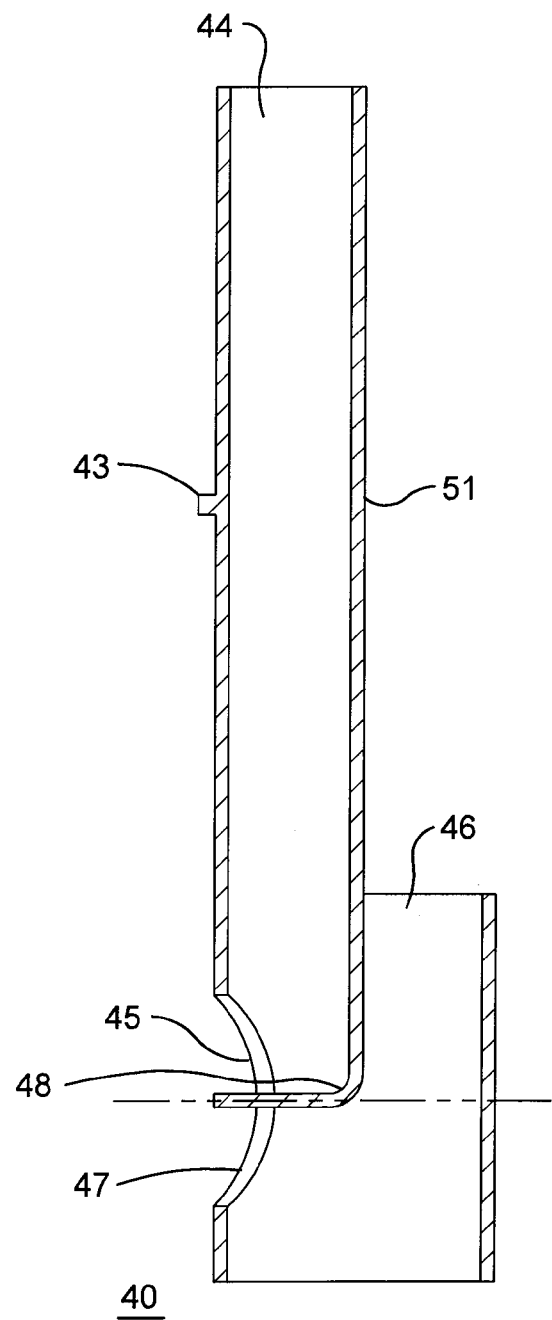
FIG. 5a
FIG. 5b

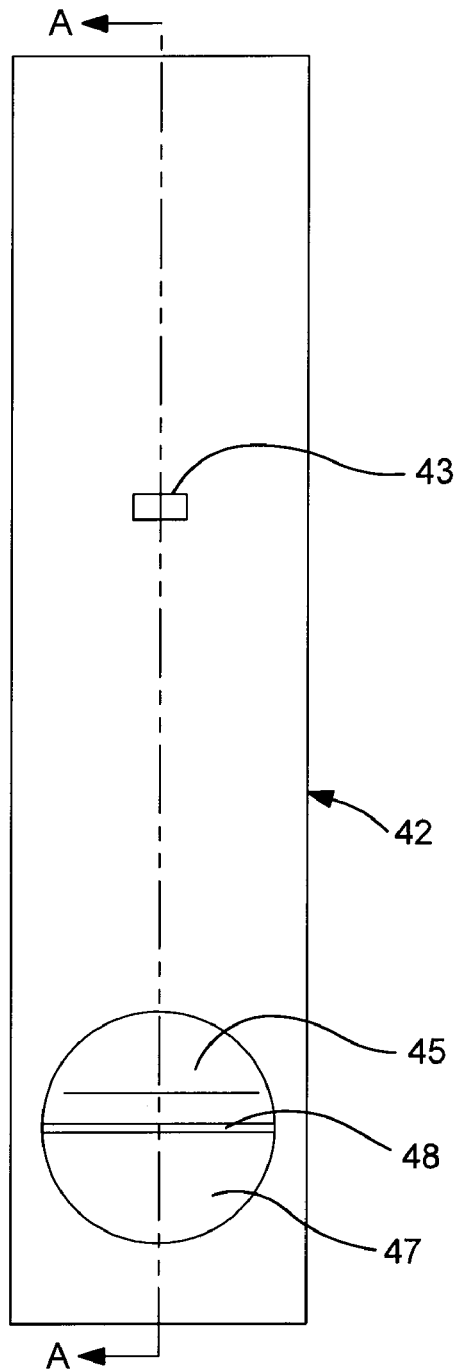
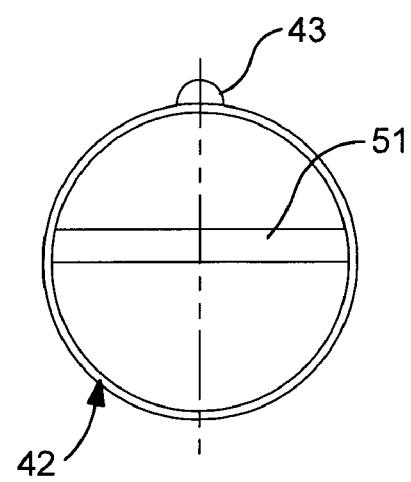
FIG. 7
FIG. 6

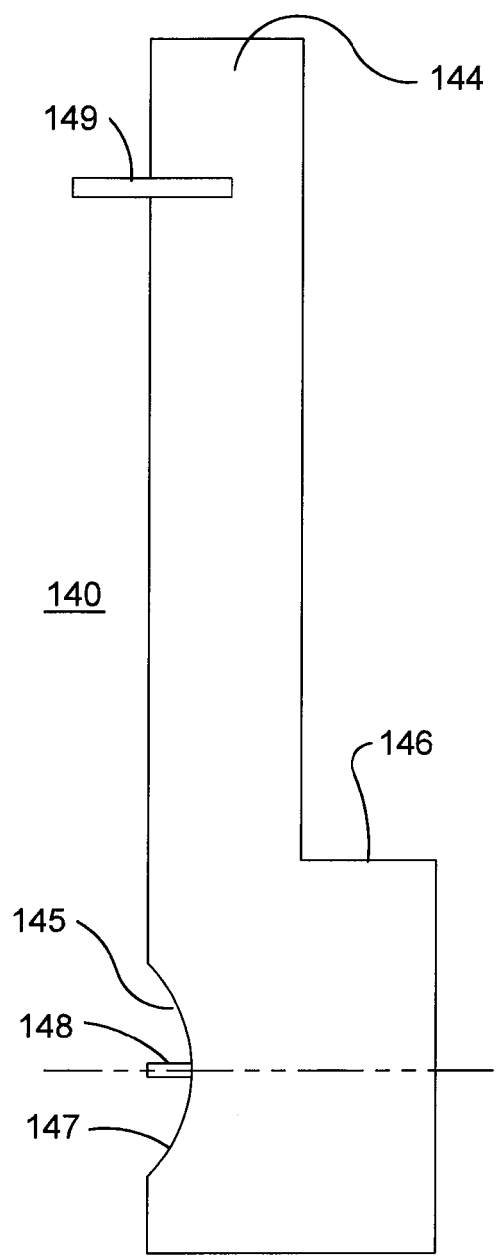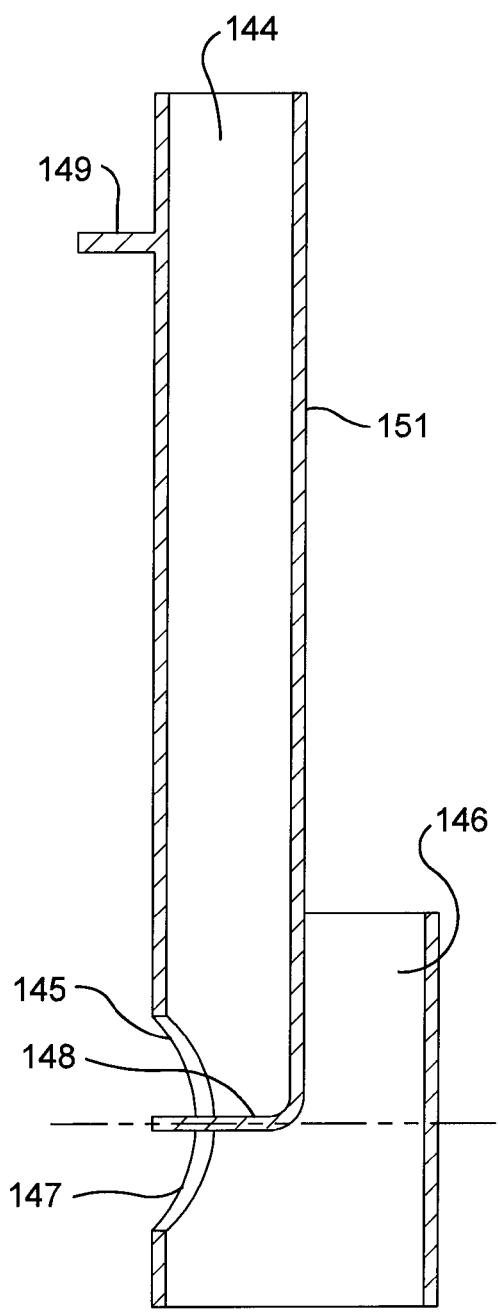
FIG. 9a
FIG. 9b

SEPARATOR FOR A RELEASE VALVE

TECHNICAL FIELD AND BACKGROUND OF THE INVENTION

This invention relates to a separator for a release valve, and more particularly to a separator for separating air from a liquid solution so that the total volume of the liquid solution is reduced and thereby a smaller release valve may be used.

Backflow release valves are well known and widely used to remove unwanted backflow of liquids carrying undesirable contaminants into a fluid supply. In a typical piping system, a plurality of check valves are used to prevent backflow. These check valves automatically close when a backflow condition occurs and prevent any backflow from reaching the fluid supply. However, these check valves may have a lag in closing such that some backflow fluid passes beyond the check valve to the supply side of the pipe, or the check valves could potentially malfunction allowing backflow to flow towards the fluid supply.

Backflow release valves are operable to sense when a backflow situation is occurring and then dump any backflow fluid within the supply lines to an external location. In this manner, the backflow cannot reach the water supply, thus avoiding any backflow contamination. Due to the relatively quick flow rate of contaminated water in a backflow situation, current release valves have to be able to dispense a large amount of contaminated water. If the release valve cannot dispense of a suitable amount of contaminated water in a quick manner, then the contaminated backflow may reach the supply side of the pipe. The relatively quick flow rate of contaminated water is typically in a largely turbulent flow and can result in significant air entrainment within the volume of contaminated water entering the backflow release valve. This requires using a relatively large backflow release valve to dispense of this air entrained contaminated water.

Accordingly, there exists a need to reduce the volume of air flow entering a release valve. There also exists a need to provide a release valve having a relatively small size.

SUMMARY OF THE INVENTION

Therefore, it is an object of the present invention to provide a dump flow valve having a relatively small size.

It is another object of the invention to reduce the volume of contaminated backflow fluid entering the release valve.

It is another object of the invention to reduce the volume of air that is entrained within the backflow fluid entering the release valve.

It is another object of the invention to provide a release valve having sufficient fluid dump rates to satisfy sanitary regulations.

These and other objects of the present invention are achieved in the preferred embodiments disclosed below by providing an improvement for a backflow release valve of the type used for a backflow event in a supply line. The improvement includes an air-liquid separator in fluid communication with the release valve and the supply line for reducing the amount of air entrained within a liquid solution entering the release valve, thereby reducing the total volume of liquid solution entering the release valve.

According to another embodiment of the invention, the separator comprises a longitudinally extending channel having a first passage for communication with a gaseous solution in the supply line and a second passage for communication with a liquid solution in the supply line.

According to another embodiment of the invention, the first passage extends vertically beyond the second passage and the first passage is sized such that the first passage extends beyond an expected waterline level during a backflow event.

According to another embodiment of the invention, the first passage and the second passage define generally equal overhead areas.

According to another embodiment of the invention, the separator is positioned within a pipe in communication with the supply line and the release valve.

According to another embodiment of the invention, the second passage extends partially along a longitudinal side of the pipe.

According to another embodiment of the invention, the valve further includes a valve seat having a first and second passage in fluid communication with the first and second passage of the longitudinally extending channel and that is also in fluid communication with the release valve.

According to another embodiment of the invention, the separator is generally cylindrical and the first passage extends in a relatively longitudinal direction towards a bottom portion of the separator and then into a relatively lateral direction at the bottom portion.

According to another embodiment of the invention, the second passage extends in a relatively longitudinal direction towards the bottom portion of the separator and then into a relatively lateral direction at the bottom portion below the laterally extending portion of the first passage.

According to another preferred embodiment of the invention, a separator for a backflow release valve is provided. The separator includes a longitudinally extending channel having a first passage for fluid communication with a gaseous solution in the supply line and a second passage for fluid communication with a liquid solution in the supply line.

According to another embodiment of the invention, the first passage extends beyond the second passage.

According to another embodiment of the invention, the separator is formed from a 3D printing process, injection molding, or casting process.

According to another embodiment of the invention, the passages are generally parallel and define a valve seat formed therewith on one end of the separator.

BRIEF DESCRIPTION OF THE DRAWINGS

Some of the objects of the invention have been set forth above. Other objects and advantages of the invention will appear as the invention proceeds when taken in conjunction with the following drawings, in which:

FIGS. 4a and 4b are perspective views of an air-liquids separator according to the present invention;

FIG. 5a is side view of the separator shown in FIGS. 4a and 4b;

FIG. 5b is a side cross sectional view of the separator shown in FIGS. 4a and 4b;

FIG. 6 is a front view of the separator shown in FIGS. 4a and 4b;

FIG. 7 is a top view of the separator shown in FIGS. 4a and 4b;

FIG. 9a is a side view of the separator shown in FIGS. 8a and 8b;

FIG. 9b is a side cross sectional view of the separator shown in FIGS. 8a and 8b;

FIG. 17b is a perspective cross sectional view of the separator and valve seat according to FIG. 17a.

DESCRIPTION OF THE PREFERRED EMBODIMENT AND BEST MODE

Figure 1:
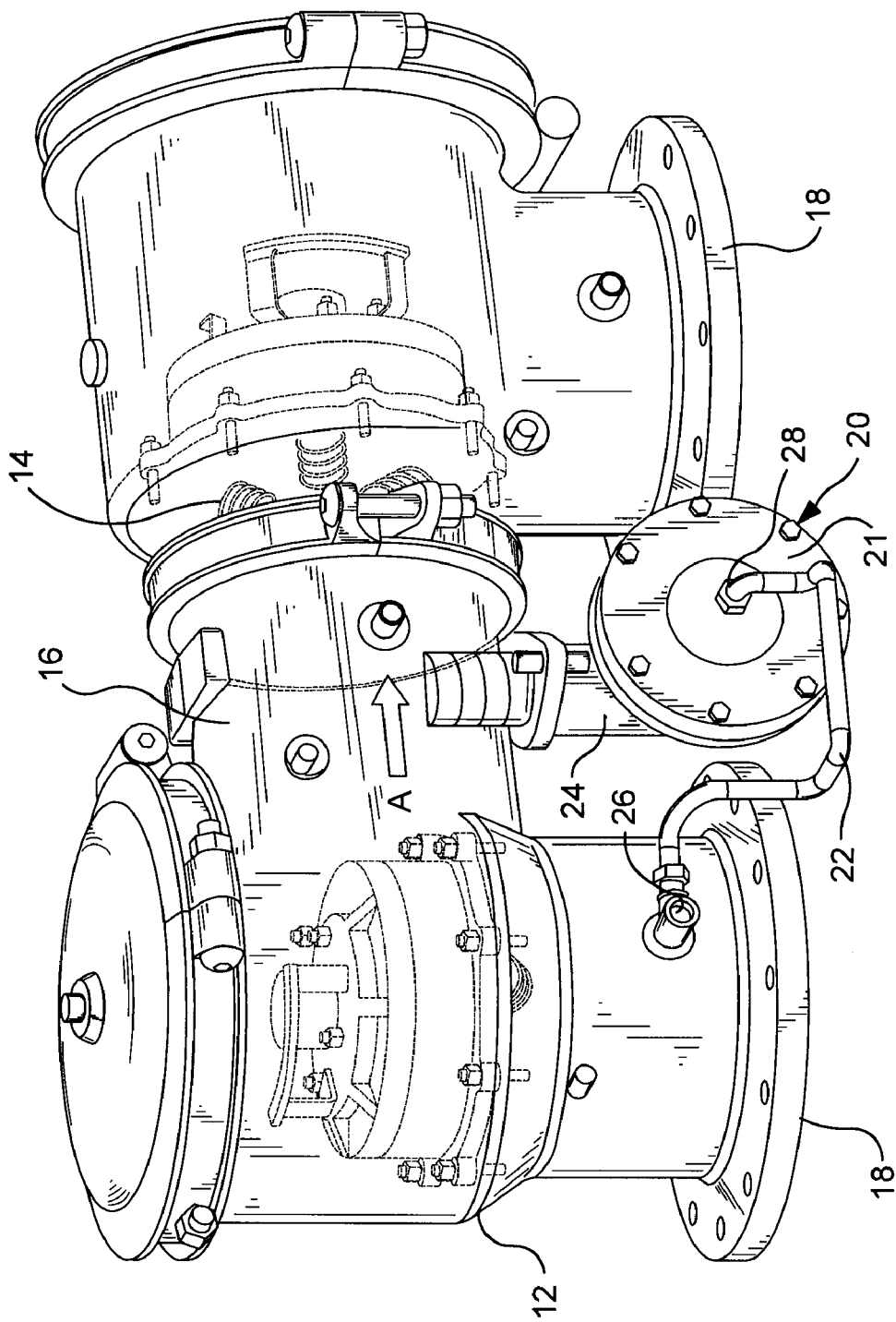
FIG. 1 is a front perspective view of a pipe system according to the present invention.
Figure 2:
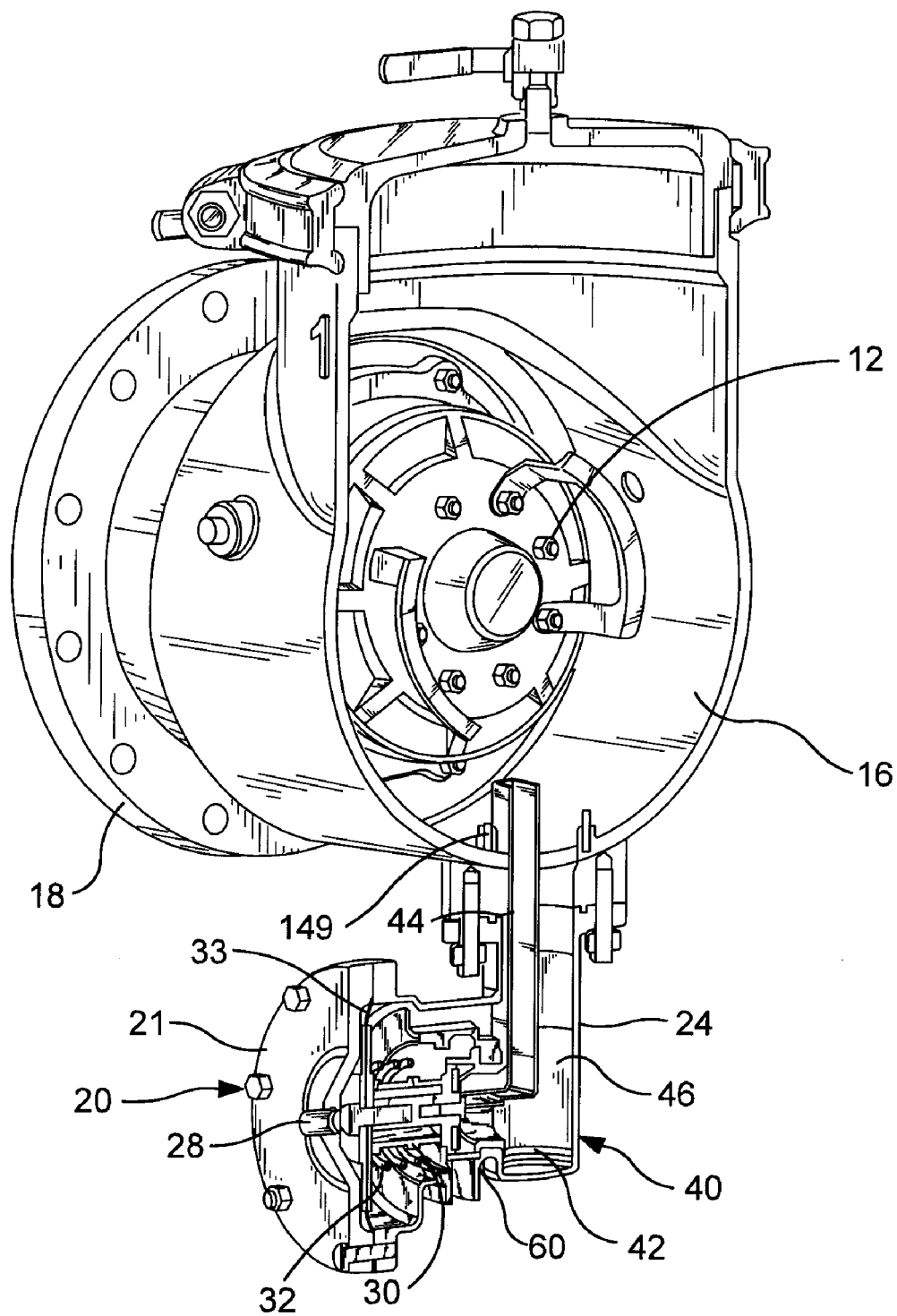
FIG. 2 is a cross sectional perspective view of the pipe system according to another embodiment of the present invention.
Figure 3:
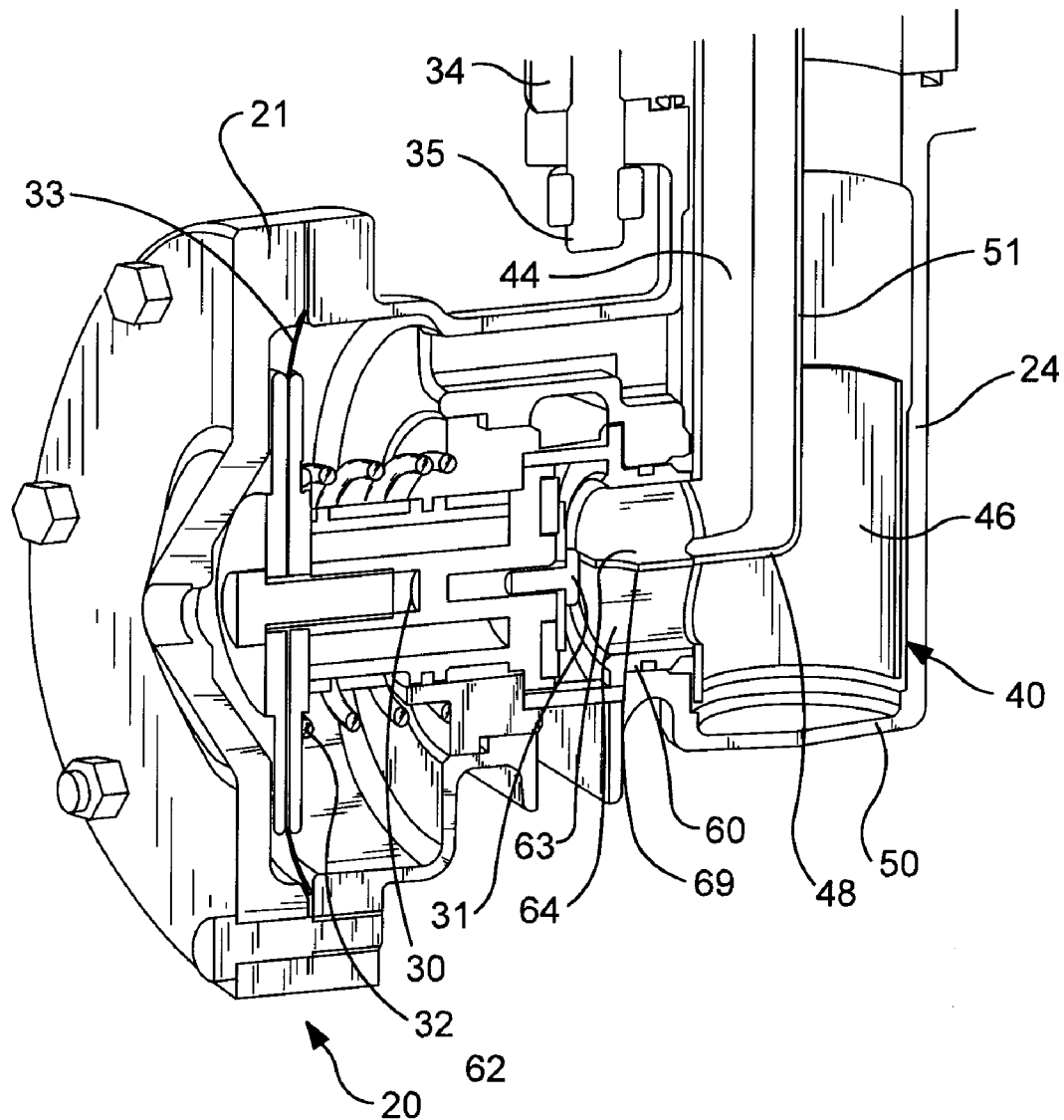
FIG. 3 is another cross sectional perspective view of the pipe system according to another embodiment of the present invention.
Figure 8A:
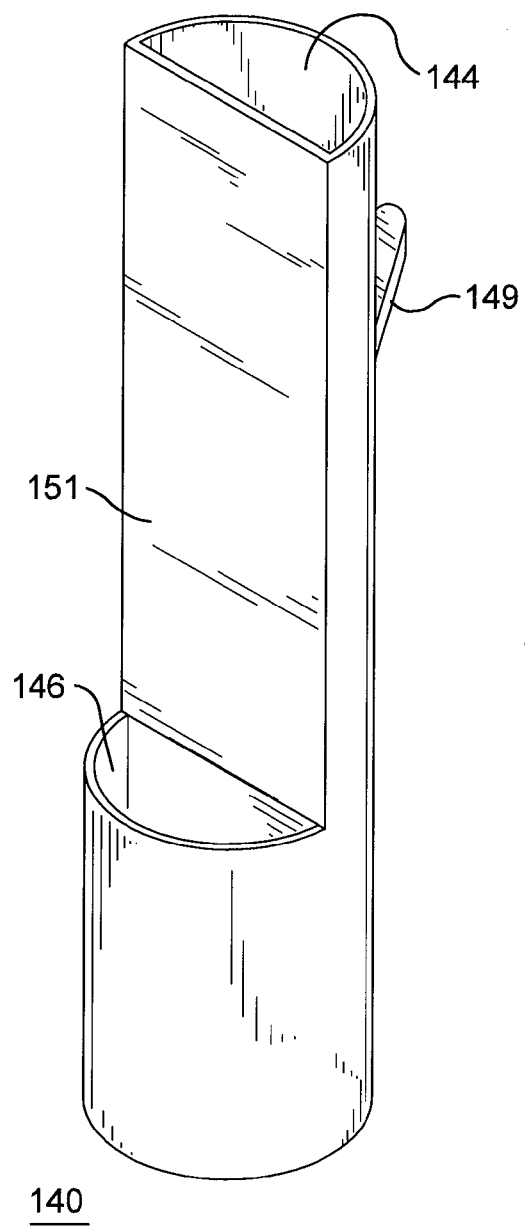
FIGS. 8a and 8b are perspective views of a separator according to an alternate embodiment of the present invention.
Figure 8B:
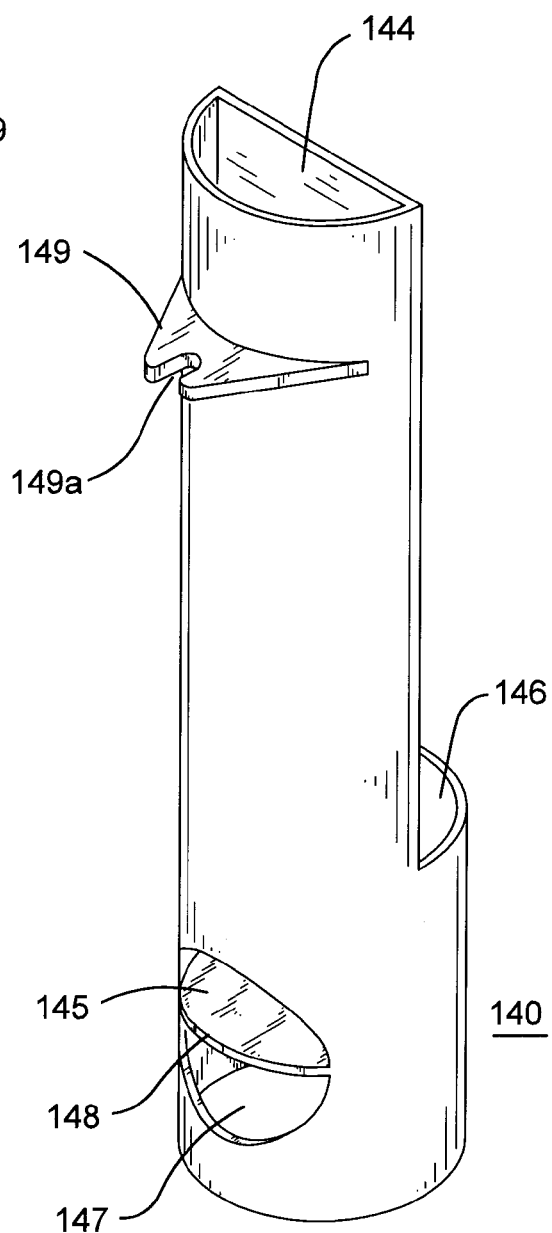
Figure 10:
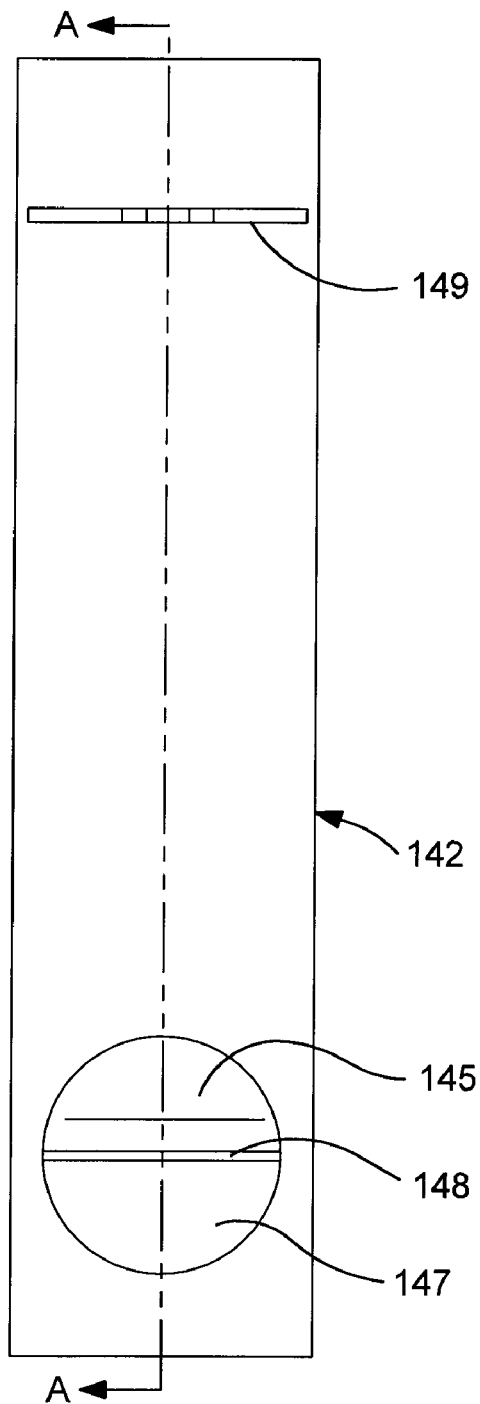
FIG. 10 is a front view of the separator shown in FIGS. 8a and 8b.

Referring now specifically to the drawings, a preferred embodiment of a fluid supply system 10 according to the present invention is illustrated in FIGS. 1 through 3, and shown generally at reference numeral 10. The fluid supply system 10 includes a first and second check valve 12, 14 positioned within the normal flow path of main supply line 16, wherein the normal flow path is designated by arrow "A" shown in FIG. 1. Fluid flows from a supply side, such as a water reservoir or treatment facility, to the destination site, which could be any number of residential or commercial sites. As shown in FIG. 1, two check valves 12, 14 are provided within supply line 16. Check valves 12, 14 are operable such that they allow fluid to pass in the direction denoted by arrow "A" so long as sufficient fluid flow is occurring in that direction, however, the check valves 12, 14 close when fluid is in a backflow situation or no fluid is flowing at all, such that fluid cannot pass the check valves 12, 14 when the valve is in the closed position. Check valve 12 is configured to maintain a predetermined loss in pressure across the valve during static and fluid flowing conditions. These valves are well known in the art and will not be discussed further.

A backflow situation may occur when there is a sudden drop in pressure at the supply side, causing the water to flow from the higher pressure at the destination side to the lower pressure on the supply side. This could occur if a fire hydrant is in use or a pipe break occurs on the supply side. As used herein, supply side is the side of the fluid supply system 10 meaning the side closest to the fluid supply, whereas the destination side is where water typically flows to from the supply side. Upstream defines the scenario when something is closer to the supply side relative to another object, and downstream defines the scenario when something is closer to the destination side relative to another object.

In the fluid supply system 10 shown in FIG. 1, the supply line 16 is connected about flanges 18 to a series of appropriate piping. A backflow release valve 20 is in fluid communication with the supply line 16 via pipe 24. The release valve 20 is operable to dispose of contaminated backflow during a backflow situation. The release valve 20 disposes of the backflow to an external location such that the contaminated backflow is no longer within the fluid supply system 10. The release valve 20 is operable when a pressure sensing system 22, shown in FIG. 1 as an elongate tube spanning between pressure sensing port 26 located upstream of the first check valve 12 and pressure sensing port 28 in fluid communication with the release valve 20, senses a pressure drop across check valve 12 below a predetermined pressure. During a backflow condition wherein check valves 12, 14 are operating as designed, both check valves 12, 14 will shut.

In a circumstance where check valve 12 is malfunctioning or otherwise not operating according to standard protocol, check valve 14 will prevent flow of potentially contaminated water, the release valve 20 will dump the water between check valve 12 and check valve 14, and the release valve 20 will admit air into the piping 16 to prevent drawing a vacuum.

In a circumstance where check valve 14 is fouled or malfunctioning, check valve 12 will prevent flow of potentially contaminated water. If the differential pressure across check valve 12 is low enough, the release valve 20 will open to dump the water.

In a circumstance where both check valve 12 and check valve 14 are fouled, release valve 20 will open in a backflow condition to dump the water entering through check valve 14 and admit air to break the vacuum upstream of check valve 12.

Without the flow divider 51, the air entering the release valve 20 will entrain large amounts of water and carry over some of this water past fouled check valve 12, resulting in contamination of the water supply. By use of the flow divider 51, the air and water have only minimal contact, reducing the potential for carry over of contaminated water into the supply system. Without the flow divider 51, the passageway in release valve 20 would need to be much larger to prevent entrainment.

As shown in FIG. 2, a different configuration of the fluid supply system 10 is represented, though the configuration of the piping is not important to the inventive concept. The release valve 20 is also shown in greater detail in FIGS. 2 and 3. The release valve 20 includes a valve assembly 30 that is slidable in response to a pressure change at pressure sensing port 28. A spring 32 acts to bias valve seat 60 away from pipe 24, keeping the release valve 20 biased in an opened position. An air-liquids separator 40 is positioned within the pipe 24. The air-liquids separator 40 is in fluid communication with the supply line 16 and the valve seat 60 of the release valve 20. The air-liquids separator 40 is a generally elongate cylindrical structure 42 having a first passage 44 and a second passage 46 defined therein and separated by a divider wall 51. The first passage 44 is operable for air-flow communication with an air solution in the supply line 16 during a backflow condition. The second passage 46 is operable for generally fluid-flow communication with a liquid solution in the supply line 16 during a backflow condition. In this manner, the first passage 44 vertically extends above the expected waterline that would occur during a backflow situation. The second passage 46 vertically extends through only a portion of pipe 24 in the illustration, but may extend to the top of pipe 24 in other embodiments, so long as it does not extend above the expected waterline. The valve seat 60 is provided in fluid communication with the separator 40 and will be described in greater detail in regards to the description of FIGS. 12 through 15. The pipe 24 includes a bottom cap 50 for restricting movement of the separator 40 and for restricting fluid flow beyond this point, and in some embodiments, may define an area of fluid flow that is laminar or turbulent fluid flow, depending on preferences.

As shown in FIG. 3, the separator 40 includes an elbow 48 formed in a divider wall 51 that divides the first passage 44 from the second passage 46. In this manner, the elbow 48 works to extend the first passage 44 and the second passage 46 from their generally vertically or longitudinally extending direction about the majority of the separator 40 to a generally horizontally or laterally extending direction at a bottom portion of the separator 40 such that the first passage 44 of separator 60 is in communication with a first passage 62 of the valve seat 60. Likewise, the second passage 46 of separator 60 is in communication with a second passage 64 of the valve seat 60. These passages 62, 64 are formed by a divider wall 63 that spans horizontally about the valve seat 60 as shown in FIG. 3. In preferred embodiments, the pipe 24 that houses separator 40 is attached to the supply line 16 by a flange 34 having a fastener 35 running there through and into the supply line 16. A notch 61 is formed in the divider wall 63 and provides clearance for fastener 31 of the valve assembly 30. Other suitable means for fastening the pipe 24 to the supply line 16 may be provided.

As shown in FIG. 4a, FIG. 4b, FIG. 5a, FIG. 5b, FIG. 6, and FIG. 7, the separator 40 is shown as a generally elongate cylindrical structure defining the first passage 44 and the second passage 46 separated by divider wall 51, as previously described. A tab 43 is provided on the separator 40 surface for appropriate placement of the separator 40 within pipe 24. In preferred embodiments, the tab 43 is 0.150 inches and the bottom of the tab 43 is positioned 7.705 inches from the bottom surface. Elbow 48 provides a lip having a height of 0.100 inches extending from the separator 40 and is preferably positioned 1.812 inches from the bottom surface. Elbow 43 preferably has an inner radius of curvature of 0.250 inches and an outer radius of curvature of 0.350 inches. The separator has an outside diameter of 2.875 inches and an inside diameter of 2.675 inches. The second passage 46 defines a height of 3.88 inches from the separator 40 bottom, whereas the separator 40 defines a total height of 11.88 inches. Tab 43 defines a radius of 0.225 inches extending from the surface of the separator 40. It is appreciated that the dimensions are offered as examples only, and are not to be construed as binding limitations.

Figure 11:
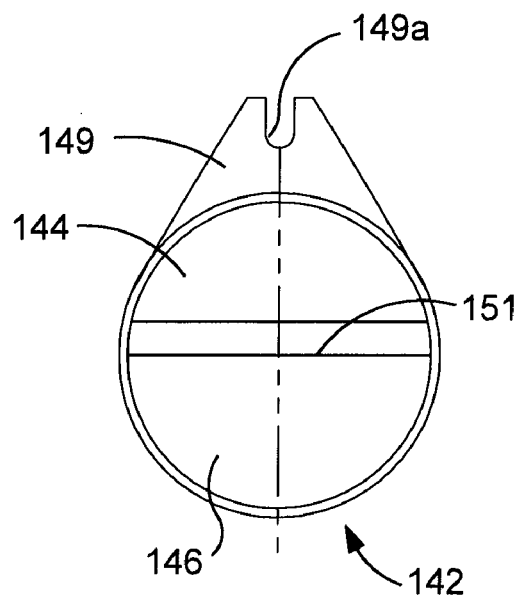
FIG. 11 is a top view of the separator shown in FIGS. 8a and 8b.

A separator according to another embodiment of the present invention is shown in FIGS. 8 through 11 and is generally designated as 140. This separator 140 shares many of the characteristics of separator 40 and only differs in the placement of securing tabs. This separator 140 includes a first passage 144, a second passage 146, a divider wall 151, an elbow 148, a first passage opening 145, and a second passage opening 147 similar to that shown in regards to separator 40. This embodiment differs in the placement of securing tab 149 having an opening 149a for receiving a fastener for securing the separator 140 to the supply line 16. All identical elements share the same dimensions as separator 40, with the exception being that securing tab 149 is positioned 10.335 inches from the separator 40 bottom. The securing tab 149 extends from the separator 140 in a generally trapezoidal shape having a pair of sides extending 30 degrees from vertical from the separator 140. Together these pair of sides define a generally flat receiving surface having a notch cut out that forms opening 149a. Opening 149a has a radius of 0.130 inches and a width of 0.260 inches. As shown in FIG. 11, the divider wall 151 is positioned equidistant from each surface of the separator cylinder 142 such that the first passage 144 and second passage 146 have approximately equal areas from overhead.

Figure 12A:
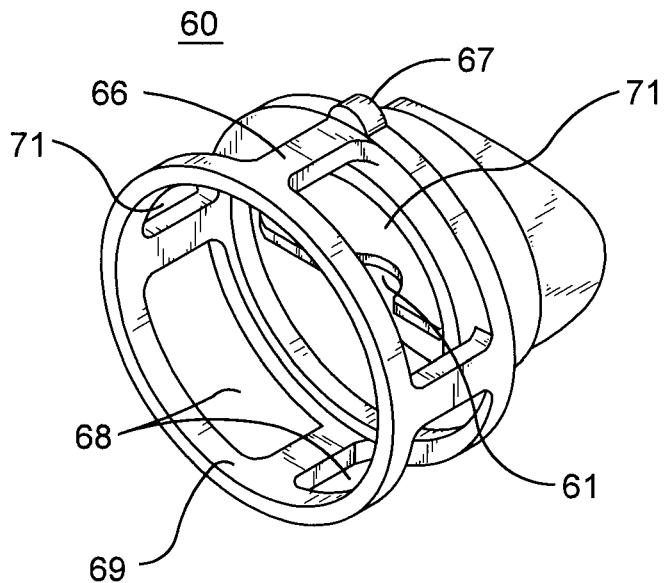
FIGS. 12a and 12b are perspective views of a valve seat according to the present invention.
Figure 12B:
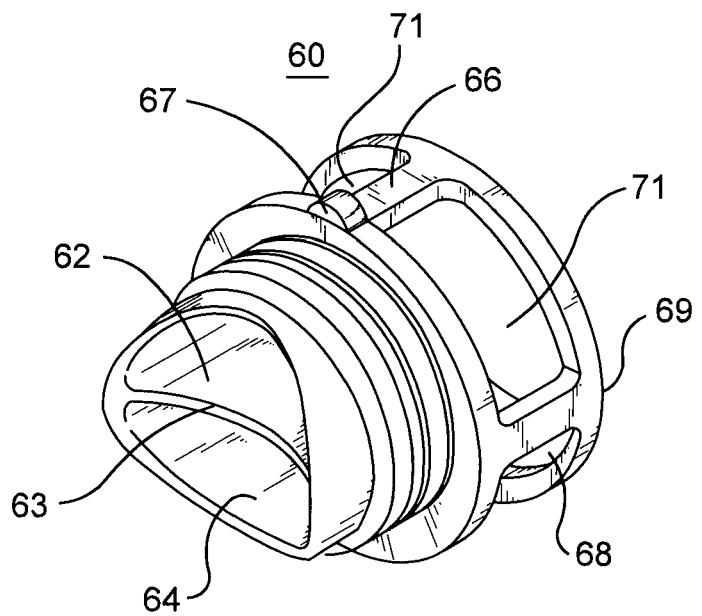
Figure 13A:
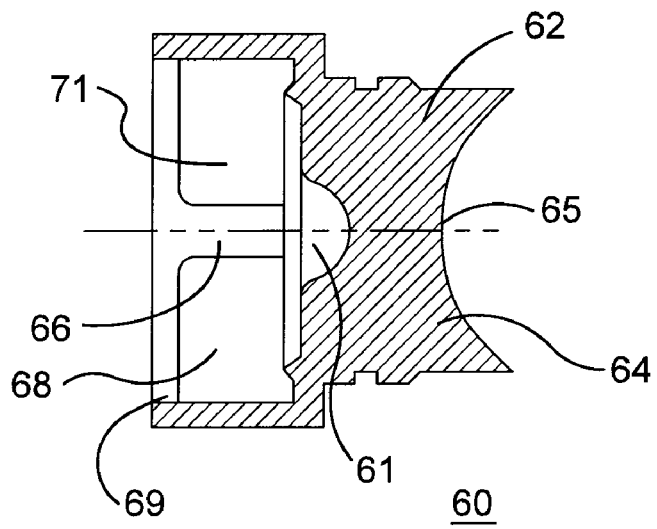
FIG. 13a is a top cross sectional view of the valve seat shown in FIGS. 12a and 12b.
Figure 13B:
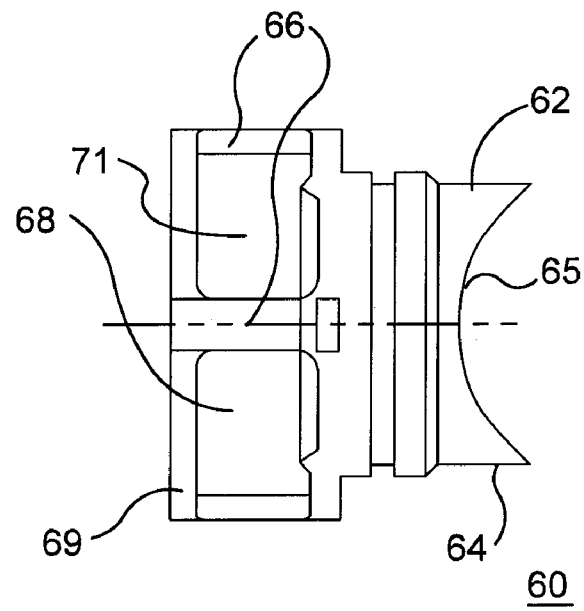
FIG. 13b is a top view of the valve seat shown in FIGS. 12a and 12b.

Valve seat 60 is shown in greater detail in FIGS. 12 and 13. As shown in FIG. 12a and FIG. 12b, valve seat 60 defines a cage structure having ribs 66 that form lower openings 68 and upper openings 71 with an end ring 69. The openings 68 are provided for passing contaminated backflow therethrough and into an external location. A tab 67 is provided for appropriate placement of the valve seat 60. As already described, the valve seat 60 defines a first passage 62 and a second passage 64 separated by divider wall 63. Cooperatively, these passages 62, 64 define an arcuate surface 65 for mating against the generally cylindrical surface of the separator 40 or 140. In preferred embodiments, the valve seat 60 has a diameter of 2.403 inches about the arcuate surface 65. The arcuate surface 65 has a radius of curvature of 1.450 inches. Ribs 66 have a width of 0.375 inches and cooperatively form a length of 1.275 inches with end ring 69. The cage structure defined by ribs 66 has a diameter of 2.900 inches. The end rings 69 have a width of 0.200 inches. The divider wall 63 has a width of 0.090 inches.

Figure 14A:
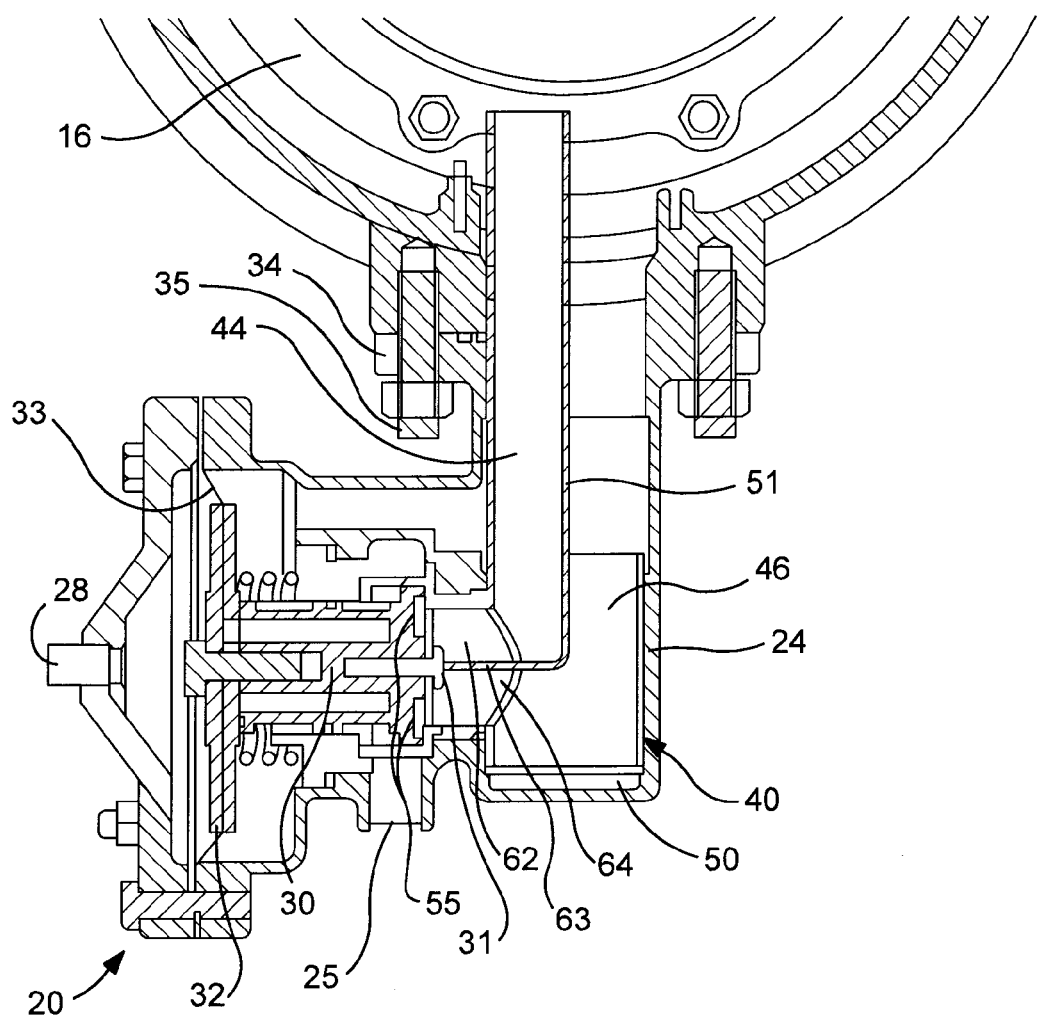
FIG. 14a is a side cross sectional view of the piping system according to the present invention, wherein the backflow release valve is in a closed position.

The valve assembly 30 is slidable within valve housing 21 such that the valve seat 60 defines a closed position whereby the valve assembly 30 is slid to the right most position against the valve seat 60 as shown in FIG. 14a. The valve assembly 30 will be maintained in the opened position by spring 32 until pressure at port 29 is sufficient to overcome the spring force of spring 32 and the pressure downstream of check valve 12, causing the diaphragm 33 to flex and push the valve assembly 30 towards the lower pressure area between check valve 12 and check valve 14, thereby placing the valve assembly 30 in the closed position, as shown in FIG. 14a. In the opened positioned, fluid drains through openings 68 in the valve seat 60 and out through opening 25 in the valve housing 21.

Figure 14B:
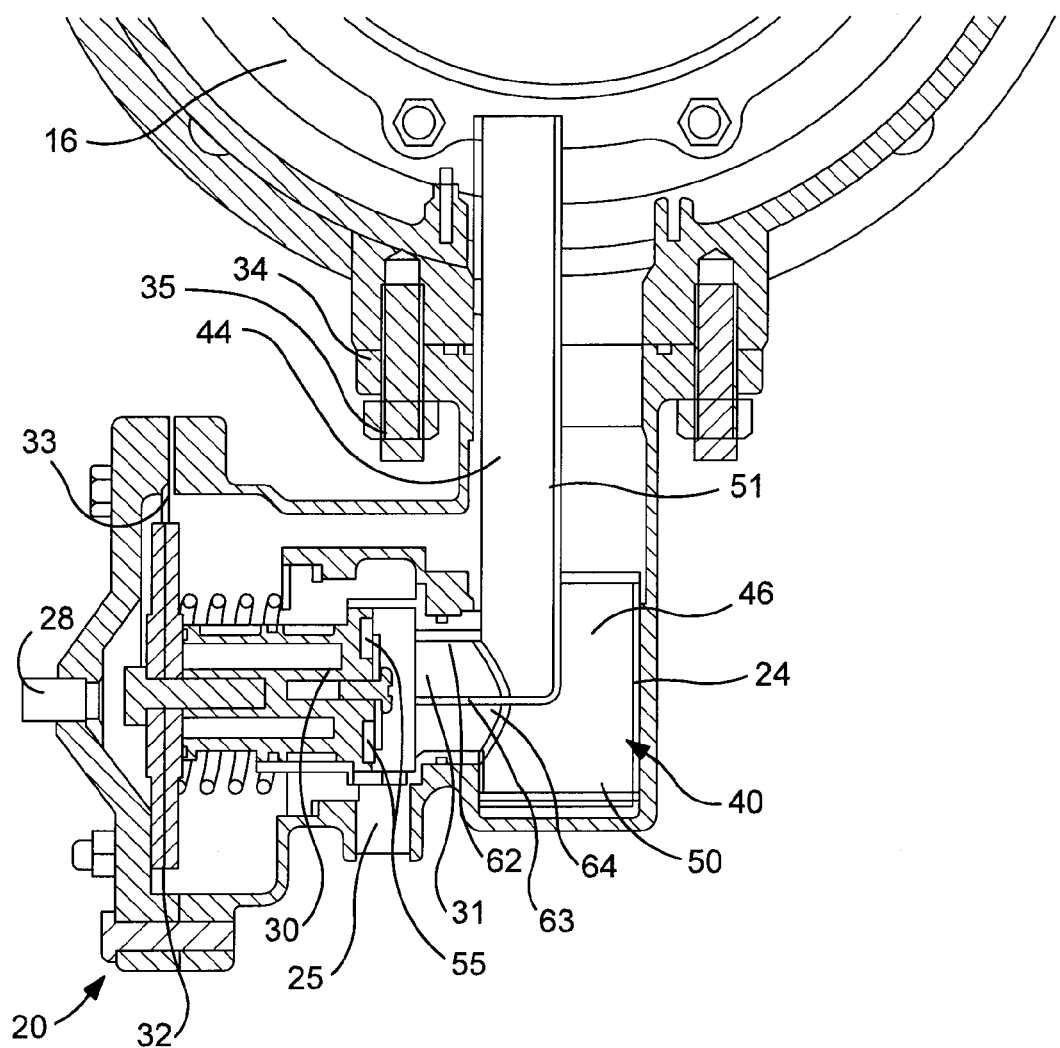
FIG. 14b is a side cross sectional view of the piping system according to the present invention, wherein the backflow release valve is in an opened position.
Figure 15A:
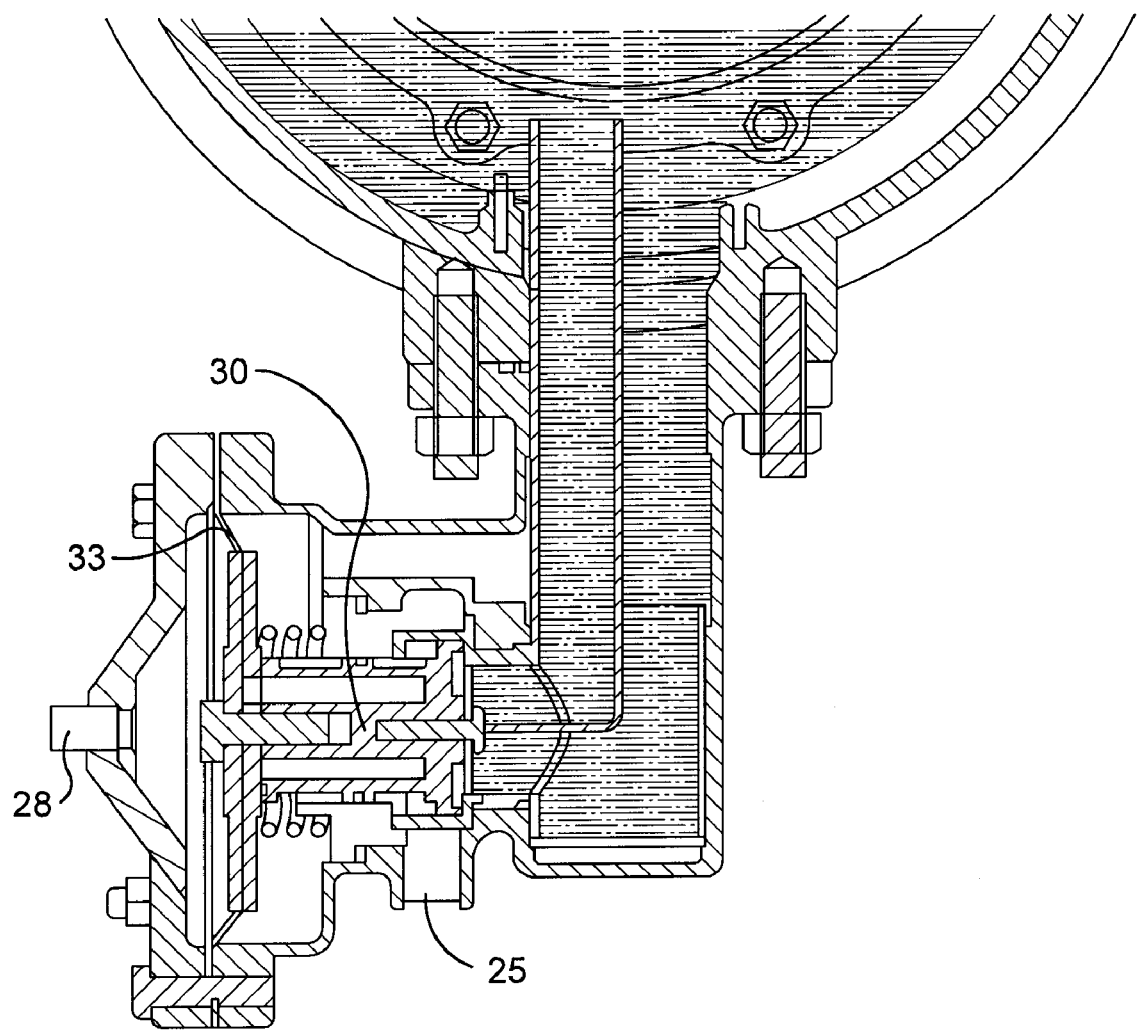
FIG. 15a is a side cross sectional view of the piping system according to the present invention having a waterflow diagram showing no movement of water and air during a normal operating situation, wherein the backflow release valve is in a closed position.
Figure 15:
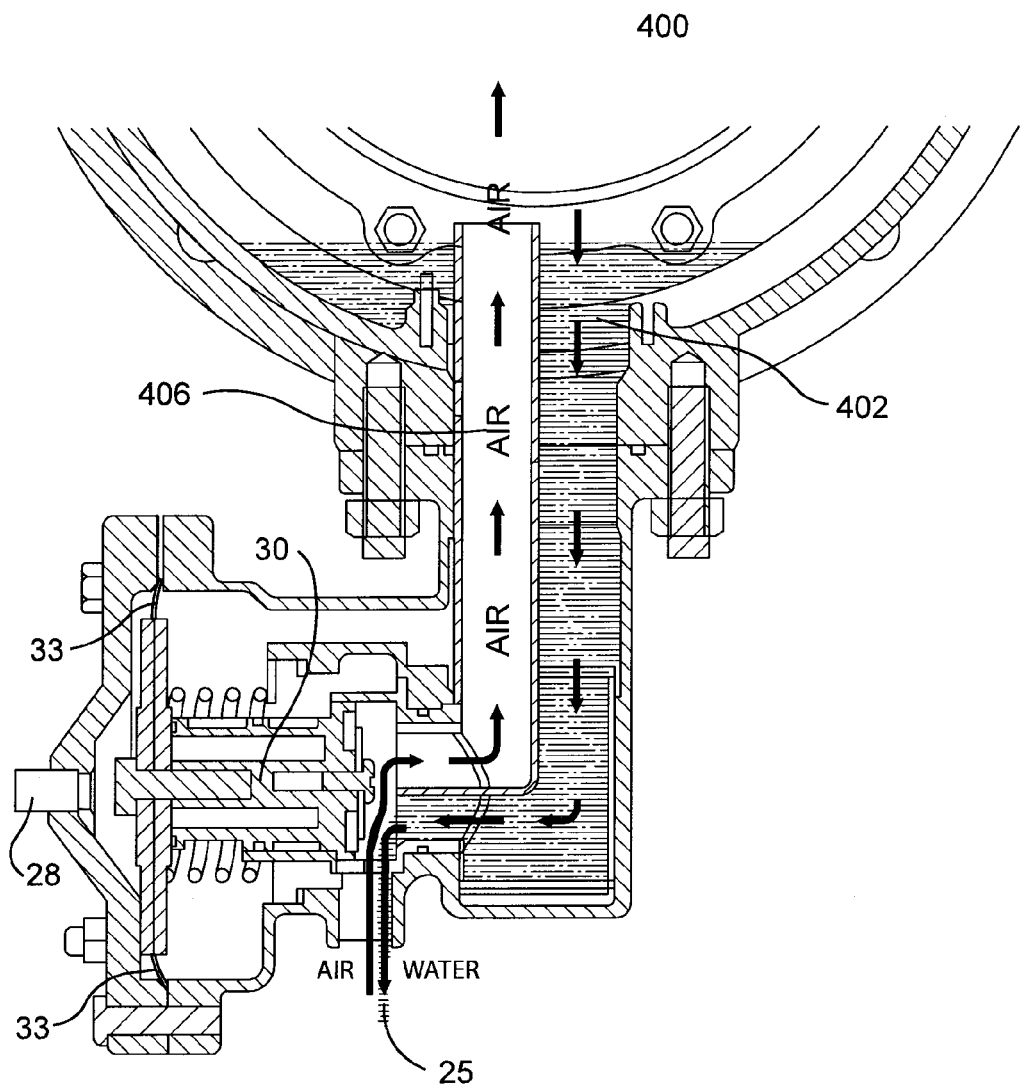
FIG. 15b is a side cross sectional view of the piping system according to the present invention having a waterflow diagram showing movement of water and air during a backflow situation, wherein the backflow release valve is in an opened position.
FIG. 15c is a side cross sectional view of a piping system that does not have a separator according to the present invention having a waterflow diagram showing movement of water and air during a backflow situation, wherein the backflow release valve is in an opened position.

Operation of the separator 40 or 140 will now be described according to the best mode requirement, and in view of FIGS. 15a and 15b, which are duplicates of FIGS. 14a and 14b, respectively, but will be shown having accompanying flow arrows showing operation of the separator 40 with check valve 20. As shown in FIG. 15a, the waterline is above both the first and second passages 44, 46, during normal flow operations and the release valve 20 is shut. In this scenario, there is essentially no flow of water 402 within each passage 44 and 46. A backflow situation is shown in FIG. 15b with a vacuum generated upstream of check valve 12 and a pressure downstream of check valve 14, with both check valves 12, 14 being fouled or malfunctioning. In this backflow situation, the expected waterline level that will occur is calculated or determined experimentally based on the requirement of appropriate regulations and standards. The first passage 44 of the separator 40 is then configured such that it extends vertically above the expected backflow waterline, thereby being in fluid communication with a gaseous solution during an expected backflow event and not backflow liquid. The second passage 46 is positioned vertically below the expected backflow waterline and is thus in fluid communication with the liquid solution 402 during a backflow event. In this manner, the pressure at the opening 45 of the first passage 44 is relatively lower than the pressure at the opening 47 of the second passage 46 because of the backflow fluid weight 402. It is known that the pressure at each respective opening is a function of the density of the fluid in that opening, the height of the openings, the velocity head, and the head loss due to friction.

Figure 15C:
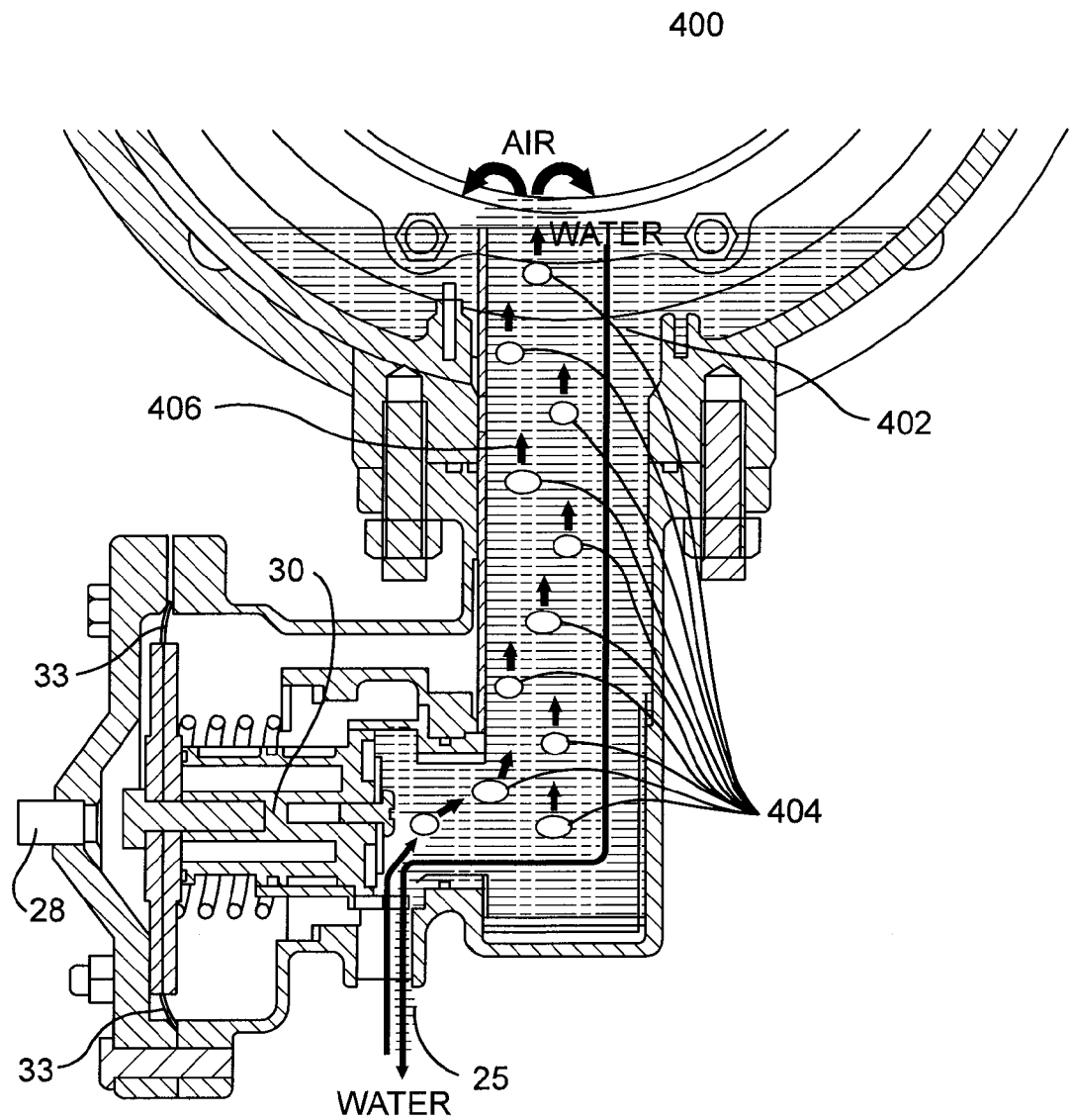

In backflow conditions without the use of separator 40 or 140 as shown in FIG. 15c, additional backflow flowing into the pipe 24 would block the air layer from returning out through the pipe opening. Entrained air 404 would pass from opening 25 through pipe 24 and create a water fountain effect. This entrained air 404 increases the necessary size of the dump valve 30. However, by adding the separator 40 of the present invention, air would be allowed to flow through opening 65 and the gap formed between the valve seat 60 and the valve assembly 30 when the relief valve 20 is in the open position, and into the first passage 44 and out to the area of low pressure. In this manner, the total volume of backflow entering release valve 20 is significantly reduced.

Figure 16:
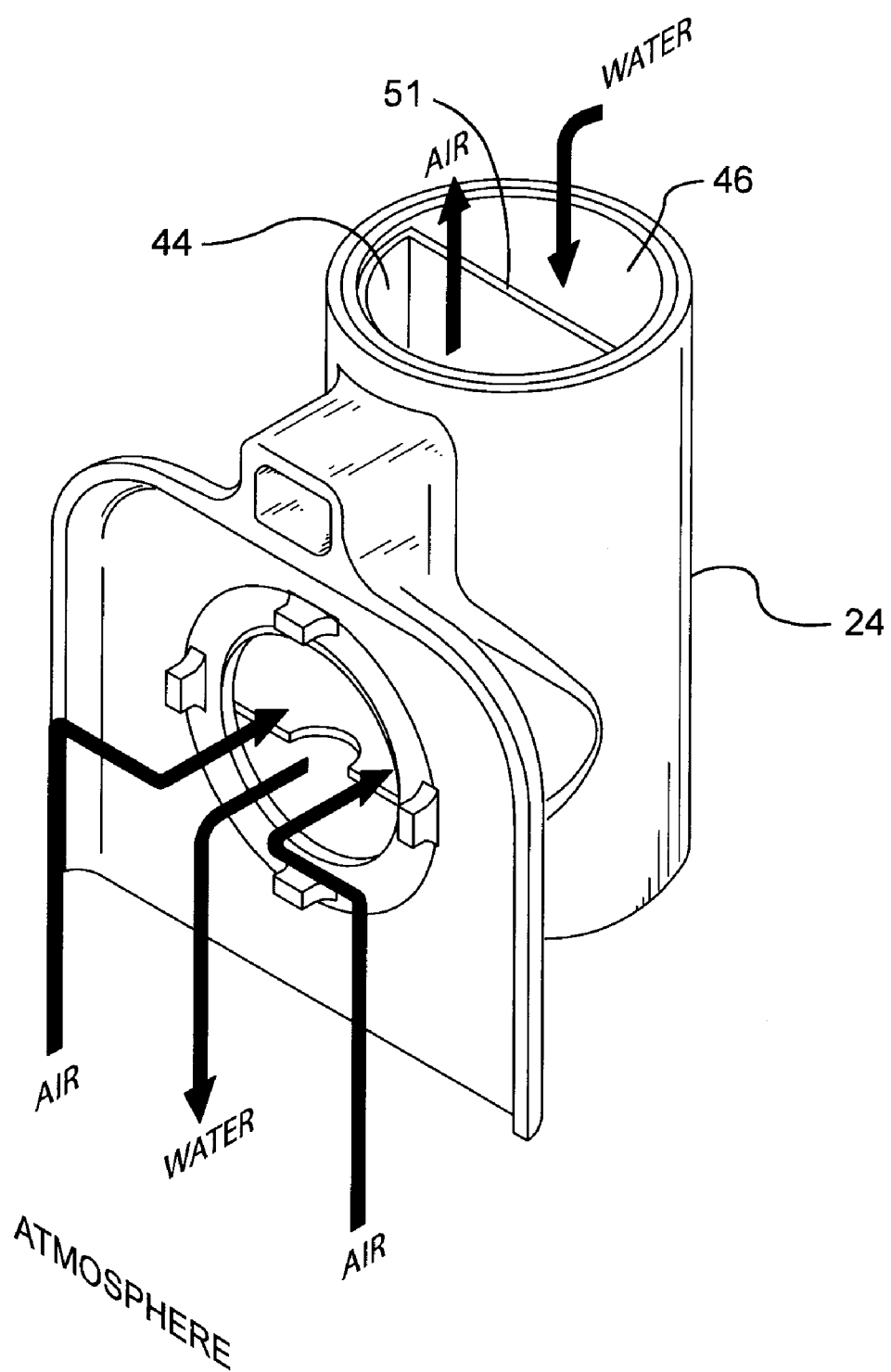
FIG. 16 is perspective view of a pipe housing the separator according to the present invention.

This concept may be better illustrated in FIG. 16, wherein a perspective view of the separator 40 positioned within pipe 24 is provided. Passage 46 of the separator 40 receives a mostly water mixture, whereas passage 44 receives a mostly air mixture. Water flows down passage 46 into elbow 48. This prevents air entering from the atmosphere into the vacuum through passage 44 from becoming entrained in the water discharging from passage 46.

Figure 17A:
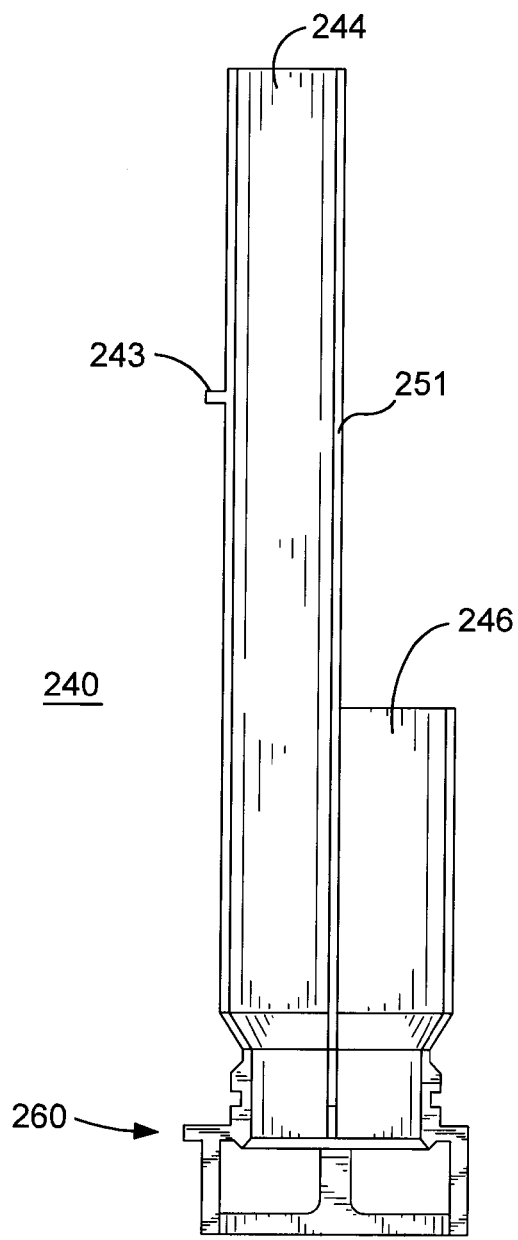
FIG. 17a is a side view of a separator and valve seat according to an alternate embodiment of the present invention.
Figure 17B:
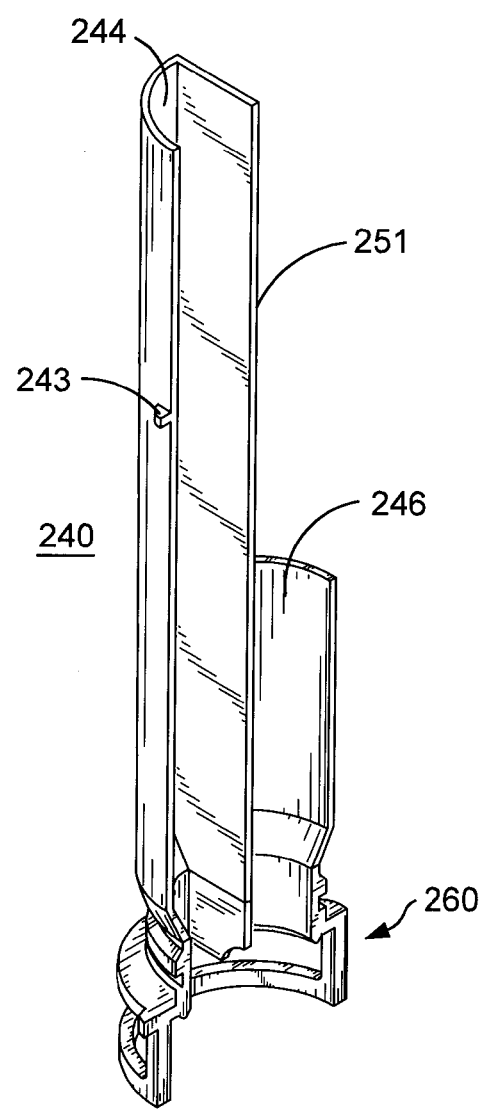

A separator 240 according to another embodiment may also be provided and is shown in FIGS. 17a and 17b. Separator 240 has two relatively straight channels 244 and 246 in communication with valve seat 260. Separator 240 is similar to the separators provided by reference numerals 40 and 140, however, separator 240 does not include an elbow joint shown in separators 40, 140. However, other components of separator 240 are shared with separators 40, 140, including divider wall 251 and tab 243. This separator 240 can form a one or multiple piece design with valve seat 260.

The separator 40 is preferably formed from a 3D printing process. In preferred embodiments, the channel 42, and valve housing 21 may also be constructed using a 3D printing process. In other embodiments, it may be preferable to form these elements out of an injection molding, casting, or other suitable processes.

Use of the separator 40, 140, or 240 is advantageous because, since the volume of total backflow fluid entering the release valve 20 is reduced, the size of the release valve 20 can be greatly reduced.

A separator for a backflow release valve is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A backflow release valve for a backflow event in a supply line, comprising:
an air-liquid separator in fluid communication with the release valve and the supply line for reducing the amount of air entrained within a liquid solution entering the release valve, the separator having a first passage in air-flow communication with a first passage of a valve seat, a second passage in fluid-flow communication with a second passage of the valve seat, and a divider wall dividing the first and second passages at the valve seat, wherein the divider wall initially extends horizontally away from the valve seat and then turns vertically such that the first passage extends vertically above an expected waterline of a backflow situation and the second passage extends to below the expected waterline of the backflow situation; and
wherein the divider wall terminates at the valve seat in a protruding alignment tab that engages a divider wall of the valve seat to align the separator with the valve seat and maintain the division of the first and second passages from the valve seat through the separator.

2. The release valve according to claim 1, wherein the first passage extends vertically beyond the second passage.

3. The release valve according to claim 1, wherein the separator is positioned within a pipe in fluid communication with the supply line and the release valve.

4. The release valve according to claim 3, wherein the second passage extends partially along a longitudinal side of the pipe.

5. The release valve according to claim 1, wherein the separator is generally cylindrical and the first passage extends in a relatively longitudinal direction towards a bottom portion of the separator and then into a relatively lateral direction at the bottom portion.

6. The release valve according to claim 5, wherein the second passage extends in a relatively longitudinal direction towards the bottom portion of the separator and then into a relatively lateral direction at the bottom portion below the laterally extending portion of the first passage.

7. The release valve according to claim 1, wherein the second passage extends in a relatively longitudinal direction towards the bottom portion of the separator and then into a relatively lateral direction at the bottom portion below the laterally extending portion of the first passage.

8. The release valve according to claim 7, wherein the separator is formed from a 3D printing process, injection-molding, or casting process.

9. The release valve according to claim 2, wherein the separator comprises a longitudinally extending channel having a first passage for communication with a gaseous solution in the supply line and a second passage for communication with a liquid solution in the supply line, wherein the passages are generally parallel and define a valve seat formed therewith on one end of the separator.

10. The release valve according to claim 1, wherein the separator comprises a securing tab laterally extending from the vertical portion of the separator defining the first passage.

11. The release valve according to claim 1, wherein the alignment tab is an extension of the divider wall of the separator and engages a divider wall of the valve seat to align the first and second passages with first and second passages of the valve seat and maintain separation between the interconnected first and second passages of each of the separator and the valve seat.

12. The release valve according to claim 1, wherein the alignment tab and the divider wall of the valve seat are complimentarily shaped.

* * * * *